US012598276B2

(12) United States Patent
Terasaki

(10) Patent No.: US 12,598,276 B2
(45) Date of Patent: Apr. 7, 2026

(54) PROJECTION DISPLAY APPARATUS

(71) Applicant: Sony Group Corporation, Tokyo (JP)

(72) Inventor: Kazuya Terasaki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 669 days.

(21) Appl. No.: 17/926,274

(22) PCT Filed: Mar. 29, 2021

(86) PCT No.: PCT/JP2021/013362
§ 371 (c)(1),
(2) Date: Mar. 28, 2023

(87) PCT Pub. No.: WO2021/235102
PCT Pub. Date: Nov. 25, 2021

(65) Prior Publication Data
US 2024/0291948 A1 Aug. 29, 2024

(30) Foreign Application Priority Data

May 20, 2020 (JP) ................................. 2020-088344

(51) Int. Cl.
*H04N 9/31* (2006.01)
(52) U.S. Cl.
CPC ......... *H04N 9/3144* (2013.01); *H04N 9/3167* (2013.01)
(58) Field of Classification Search
CPC ...... G03B 21/00; G03B 21/16; G03B 21/145; G03B 21/2013; G03B 21/2033; H04N 9/3141; H04N 9/3102; H04N 9/3105; H04N 9/3108; H04N 9/3144; H04N 9/3167; F28D 15/00; F28D 15/02; F28D 15/04; F28D 15/024; F28D 15/0266; F28D 15/0275

See application file for complete search history.

(56) References Cited

U.S. PATENT DOCUMENTS

| | | | |
|---|---|---|---|
| 2007/0291234 A1 | 12/2007 | Momose | |
| 2008/0055563 A1 | 3/2008 | Momose | |
| 2009/0059580 A1 | 3/2009 | Kwon | |

(Continued)

FOREIGN PATENT DOCUMENTS

| | | | |
|---|---|---|---|
| CN | 2735540 Y | 10/2005 | |
| CN | 1869806 A | 11/2006 | |

(Continued)

OTHER PUBLICATIONS

International Search Report from corresponding PCT application PCT/JP2021/013362, dated Jun. 8, 2021.

*Primary Examiner* — Sultan Chowdhury
(74) *Attorney, Agent, or Firm* — K&L Gates LLP

(57) ABSTRACT

A projection display apparatus according to an embodiment of the present disclosure includes: a light source unit; an image formation optical system; a projection optical system; a cooling unit; and a heat exchanger. The image formation optical system includes a spatial modulation element that modulates light emitted from the light source unit. The projection optical system projects the light from the spatial modulation element. The cooling unit includes a fan that sends cooling wind to the image formation optical system. The heat exchanger is disposed to be right opposed to the fan.

14 Claims, 6 Drawing Sheets

(56)     References Cited

U.S. PATENT DOCUMENTS

| | | | |
|---|---|---|---|
| 2011/0242499 A1 | 10/2011 | Terao | |
| 2012/0154762 A1* | 6/2012 | Nishihata | G03B 21/16 |
| | | | 353/58 |
| 2012/0327316 A1 | 12/2012 | Okada et al. | |
| 2014/0198304 A1 | 7/2014 | Sun et al. | |
| 2017/0214892 A1 | 7/2017 | Nagatani | |
| 2018/0143518 A1 | 5/2018 | Tsai et al. | |
| 2020/0081333 A1* | 3/2020 | Chung | F28D 15/0233 |
| 2020/0341358 A1* | 10/2020 | Hou | H05K 7/20 |
| 2021/0152793 A1* | 5/2021 | Usami | G03B 21/16 |
| 2021/0223671 A1* | 7/2021 | Tsai | H04N 9/3144 |
| 2022/0121099 A1* | 4/2022 | Otsuki | G03B 21/204 |

FOREIGN PATENT DOCUMENTS

| | | | |
|---|---|---|---|
| CN | 204302652 U | 4/2015 | |
| CN | 106462042 A | 2/2017 | |
| CN | 109643049 A | 4/2019 | |
| JP | 2000338603 A | 12/2000 | |
| JP | 2002189250 A | 7/2002 | |
| JP | 2005121250 A | 5/2005 | |
| JP | 2006293177 A | 10/2006 | |
| JP | 2008170774 A | 7/2008 | |
| JP | 2008217041 A | 9/2008 | |
| JP | 2011215457 A | 10/2011 | |
| JP | 2013213876 A | 10/2013 | |
| JP | 2015005715 A | 1/2015 | |
| JP | 2015194716 A | 11/2015 | |
| JP | 2018084777 A | 5/2018 | |
| TW | 200604715 A | 2/2006 | |
| WO | 2011111203 A1 | 9/2011 | |

* cited by examiner

[FIG. 1]

[ FIG. 2 ]
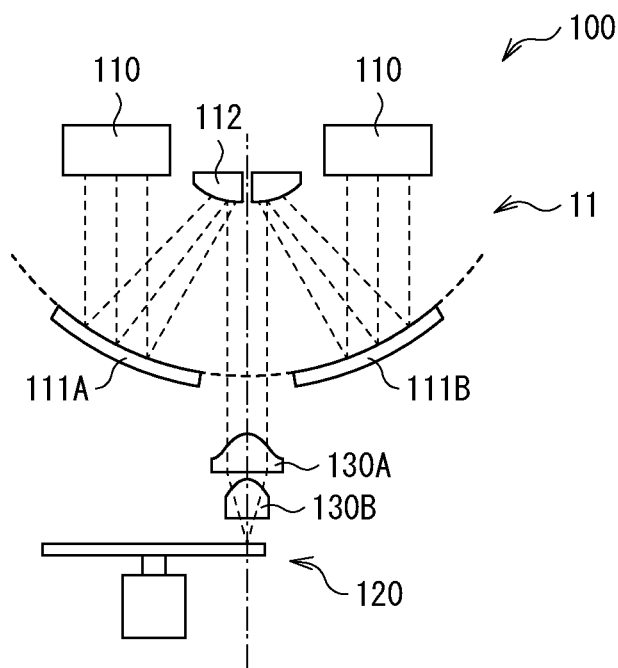

[ FIG. 3 ]
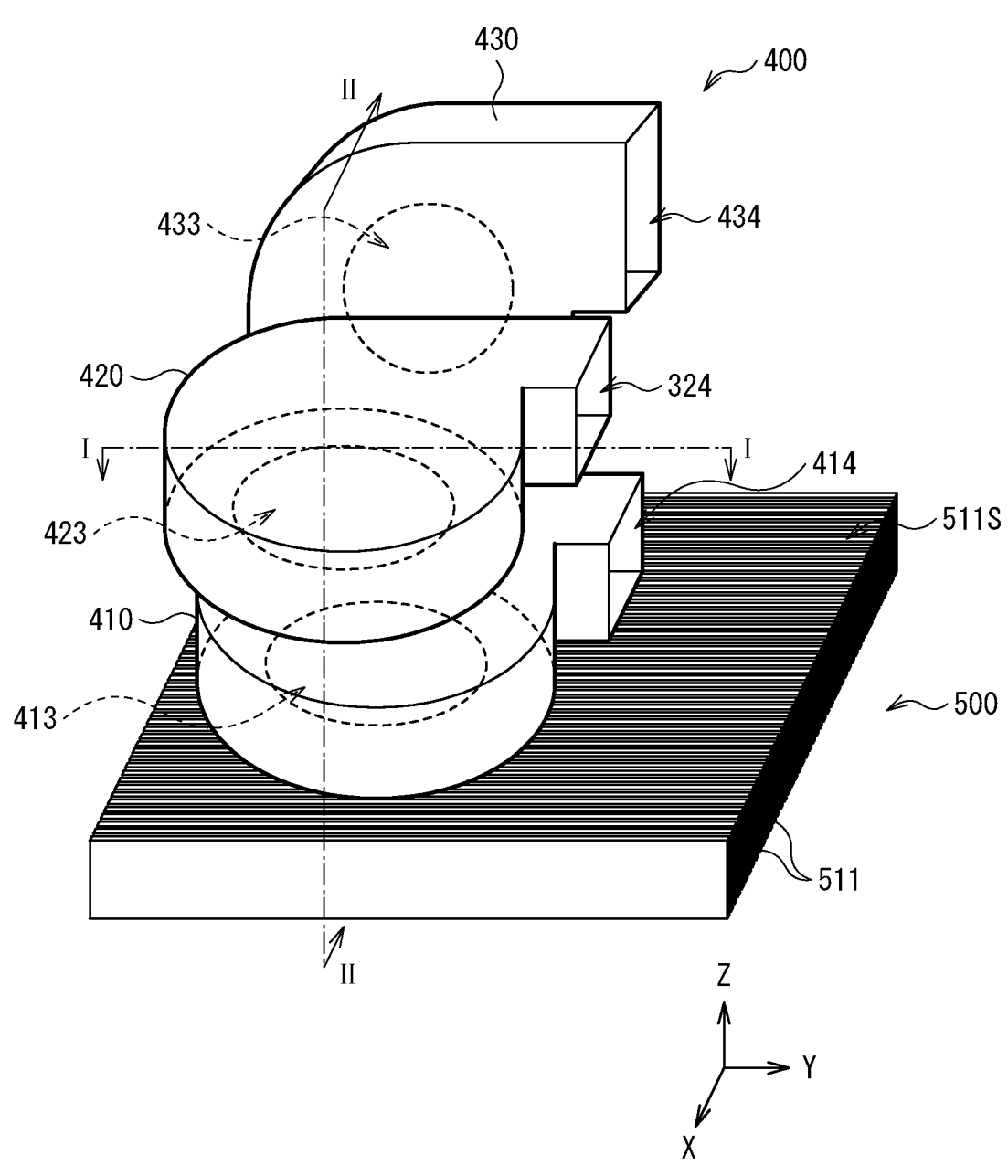

[ FIG. 4 ]
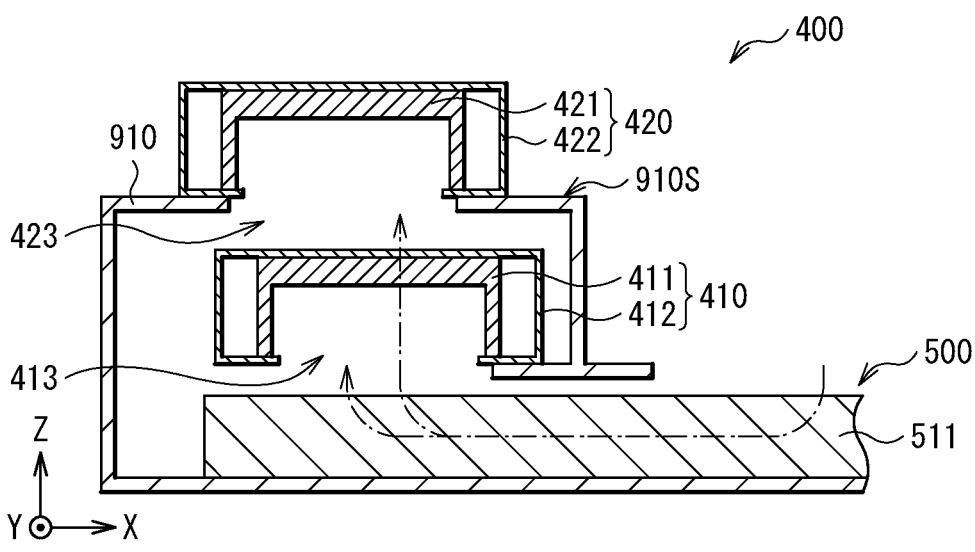
[ FIG. 5 ]
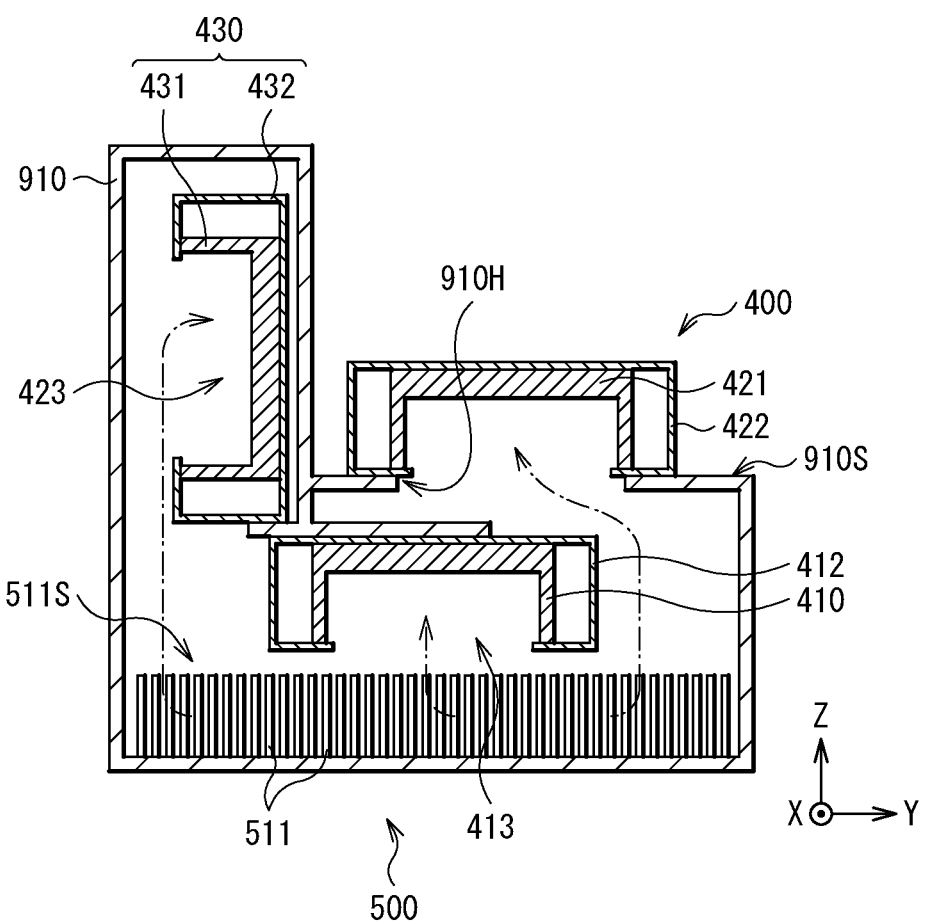

[ FIG. 6 ]
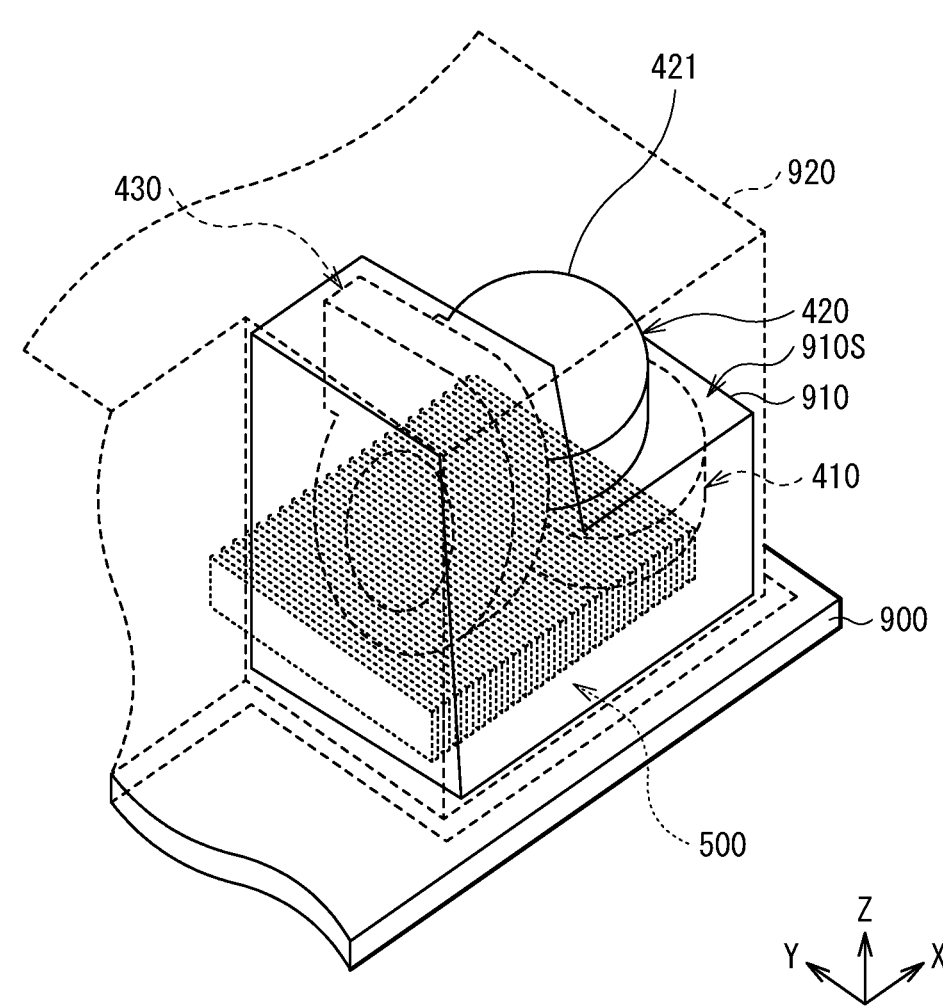

[ FIG. 7 ]
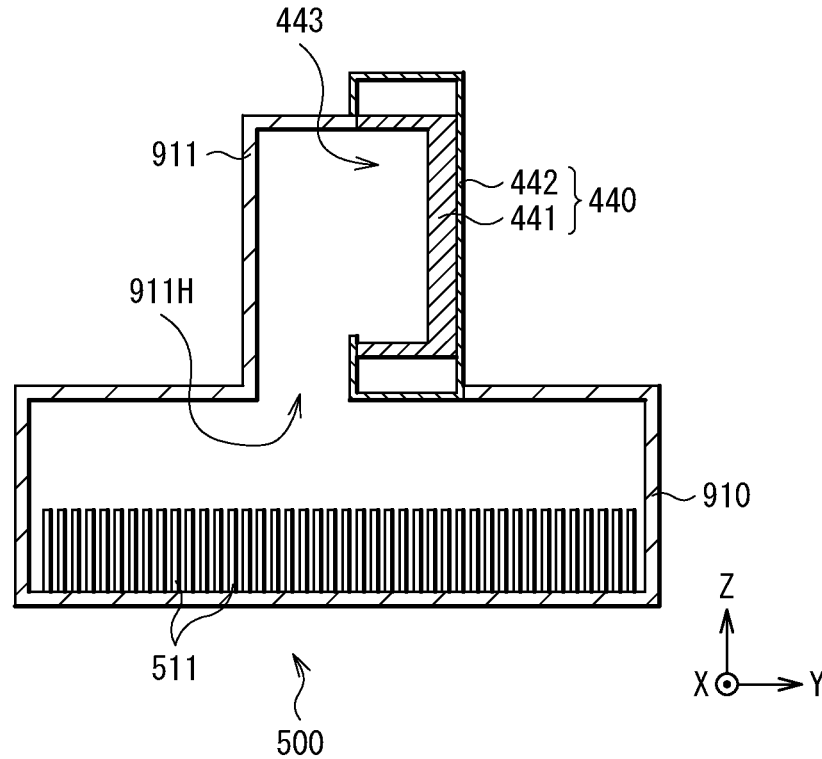
[ FIG. 8 ]
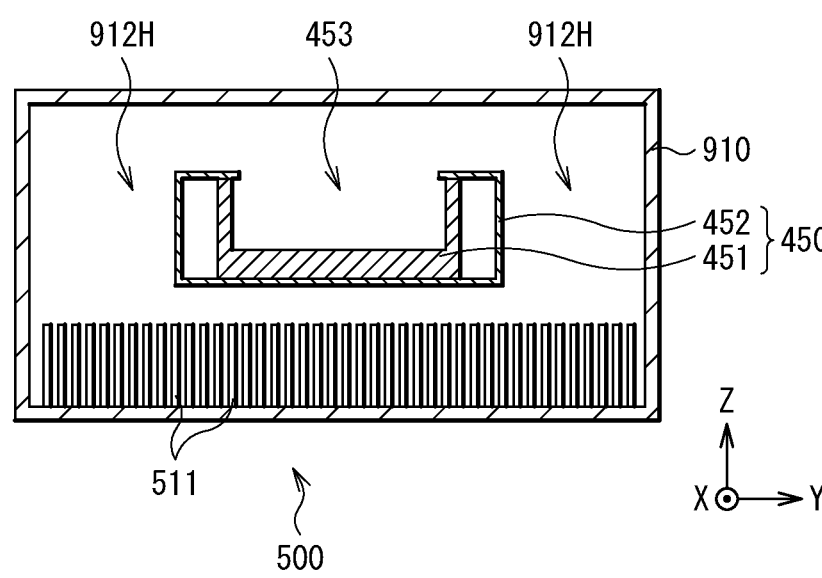

PROJECTION DISPLAY APPARATUS

TECHNICAL FIELD

The present disclosure relates, for example, to a projection display apparatus including a cooling unit that cools an optical system.

BACKGROUND ART

For example, PTL 1 discloses a projector having a first circulation flow path, a second circulation flow path, and a third circulation flow path. In the first circulation flow path, a first refrigerant (gas) circulates that cools a first cooling target disposed in a first space. The first space is substantially sealed. In the second circulation flow path and the third circulation flow path, a second refrigerant and a third refrigerant (each of which is liquid) respectively circulate that cool the first refrigerant. PTL 2 discloses a projection display apparatus having a first air path and a second air path. The first air path is provided in a sealed space. The first air path cools an illuminating optical section and an image formation section disposed in parallel with each other. The second air path is provided between a housing that forms the sealed space and a case that houses a light source section in addition to the illuminating optical section and the image formation section. The second air path cools the light source section.

CITATION LIST

Patent Literature

PTL 1: Japanese Unexamined Patent Application Publication No. 2018-84777

PTL 2: Japanese Unexamined Patent Application Publication No. 2008-170774

SUMMARY OF THE INVENTION

Incidentally, the projection display apparatus is requested to be quieter.

It is therefore desirable to provide a projection display apparatus that is allowed to be quieter.

A projection display apparatus according to an embodiment of the present disclosure includes: a light source unit; an image formation optical system; a projection optical system; a cooling unit; and a heat exchanger. The image formation optical system includes a spatial modulation element that modulates light emitted from the light source unit. The projection optical system projects the light from the spatial modulation element. The cooling unit includes a fan that sends cooling wind to the image formation optical system. The heat exchanger is disposed to be right opposed to the fan.

In the projection display apparatus according to the embodiment of the present disclosure, the fan provided in the cooling unit and the heat exchanger are disposed to be right opposed to each other. This causes the heat exchanger to eliminate noise generated from the fan. The fan sends the cooling wind to the image formation optical system including the spatial modulation element.

BRIEF DESCRIPTION OF DRAWING

FIG. 1 is a schematic diagram illustrating a schematic configuration of a projection display apparatus according to an embodiment of the present disclosure.

FIG. 2 is a diagram illustrating an example of a configuration of a light source unit illustrated in FIG. 1.

FIG. 3 is a perspective view of examples of configurations of a cooling unit and a heat exchanger illustrated in FIG. 1.

FIG. 4 is a cross-sectional view taken along an I-I line illustrated in FIG. 3.

FIG. 5 is a cross-sectional view taken along an II-II line illustrated in FIG. 3.

FIG. 6 is a diagram illustrating an example in which the cooling unit and the heat exchanger are housed in the projection display apparatus illustrated in FIG. 1.

FIG. 7 is a cross-sectional view of other examples of configurations of a cooling unit and a heat exchanger according to a modification example 1 of the present disclosure.

FIG. 8 is a cross-sectional view of other examples of configurations of a cooling unit and a heat exchanger according to a modification example 2 of the present disclosure.

MODES FOR CARRYING OUT THE INVENTION

The following describes an embodiment of the present disclosure in detail with reference to the drawings. The following description is a specific example of the present disclosure, but the present disclosure is not limited to the following modes. In addition, the present disclosure is not also limited to the disposition, dimensions, dimension ratios, and the like of the respective components illustrated in the respective diagrams. It is to be noted that description is given in the following order.

1. Embodiment (an example of a projection display apparatus in which a fan included in a cooling unit and a heat exchanger are disposed to be right opposed to each other)
1-1. Configuration of Projection Display Apparatus
1-2. Configuration of Cooling Unit
1-3. Workings and Effects
2. Modification Examples

1. Embodiment

Figure 1:
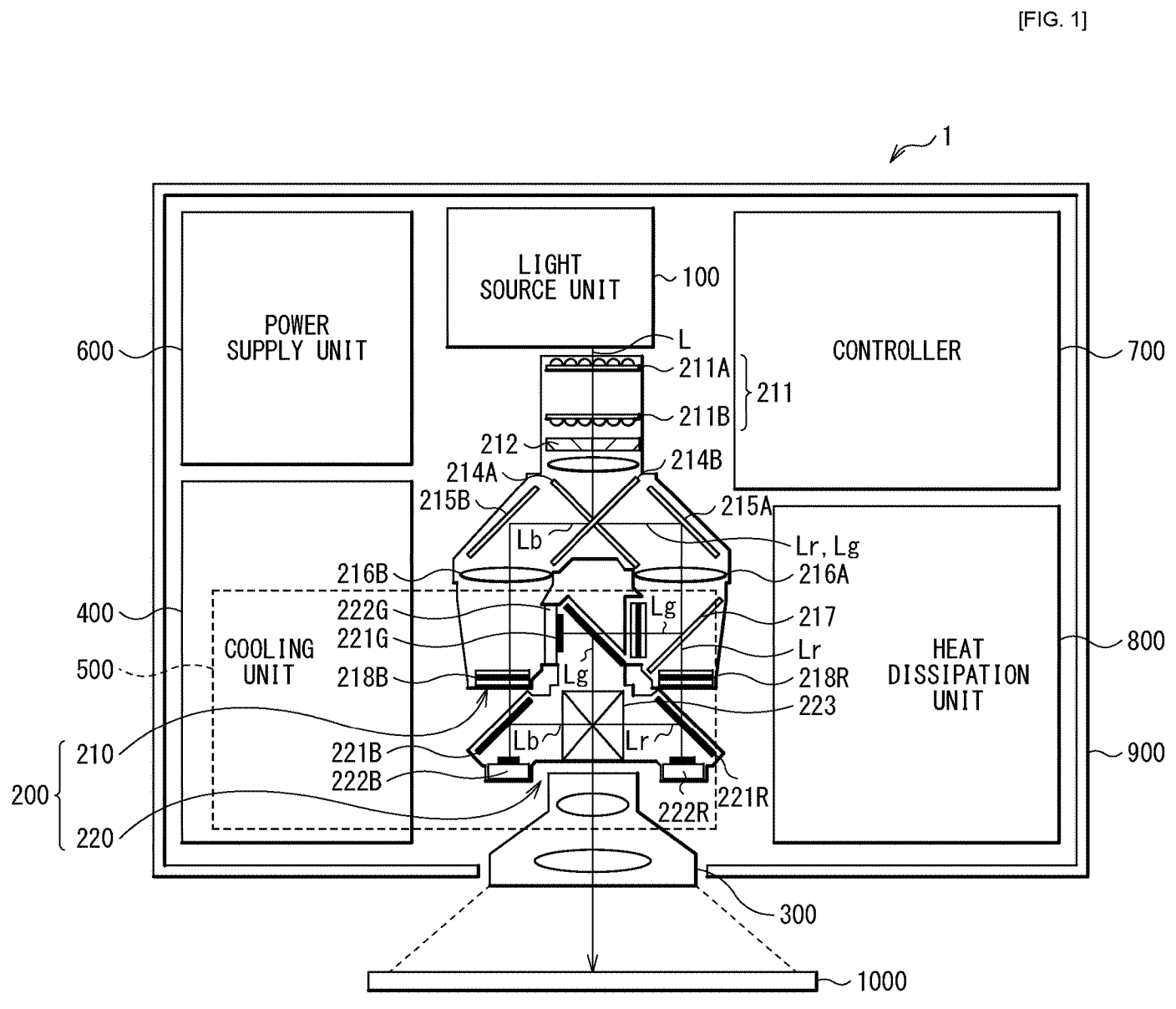

FIG. 1 illustrates an example of a schematic configuration of a projection display apparatus (projection display apparatus 1) according to an embodiment of the present disclosure. The projection display apparatus 1 is a projection display apparatus that projects an image (image light) on a screen 1000 (projection surface) such as a wall surface. The projection display apparatus 1 includes, for example, a light source unit 100, an image formation optical system 200, and a projection optical system 300. The image formation optical system 200 includes spatial modulation elements (liquid crystal panels 231R, 231G, and 231B) that each modulate light (illumination light L) emitted from the light source unit 100. The projection optical system 300 projects the light (image light) from each of the liquid crystal panels 231R, 231G, and 231B. The projection display apparatus 1 further includes a cooling unit 400 and a heat exchanger 500. The cooling unit 400 includes a fan (e.g., fan 410; see FIG. 3) that sends cooling wind to the image formation optical system 200. In the present embodiment, for example, the fan 410 is disposed to be right opposed to the heat exchanger 500.

1-1. Configuration of Projection Display Apparatus

The projection display apparatus 1 is, for example, a reflective 3LCD projection display apparatus that performs optical modulation by using reflective liquid crystal panels (Liquid Crystal Displays: LCDs). As described above, the projection display apparatus 1 includes the light source unit 100, the image formation optical system 200, the projection optical system 300, the cooling unit 400, and the heat exchanger 500. For example, the fan 410 included in the cooling unit 400 and the heat exchanger 500 are disposed to be right opposed to each other. The projection display apparatus 1 further includes a power supply unit 600, a signal processing unit 700, and a heat dissipation unit 800. These light source unit 100, image formation optical system 200, projection optical system 300, cooling unit 400, heat exchanger 500, power supply unit 600, signal processing unit 700, and heat dissipation unit 800 are housed in a case 900.

FIG. 2 illustrates an example of a configuration of the light source unit 100 illustrated in FIG. 1. The light source unit 100 includes a light source 110, condensing mirrors 111A, 111B, and 112, a wavelength converter 120, and condensing lenses 130A and 130B.

The light source 110 is a solid-state light source that outputs light in a predetermined wavelength range. The light source 110 is for exciting phosphor particles included in the phosphor layer of the wavelength converter 12 described below. It is possible to use, for example, a semiconductor laser (Laser Diode: LD) as the light source 110. In addition, a light emitting diode (Light Emitting Diode: LED) may also be used.

Each of the condensing mirrors 111A and 111B has a concave reflecting surface that substantially collimates and condenses fluxes of light outputted from a plurality of LDs on the condensing mirror 112. The plurality of LDs is disposed in the light source 110. The condensing mirrors 112 are for reflecting the pieces of light condensed by the condensing mirrors 111A and 111B to the wavelength converter 120.

The wavelength converter 120 converts light (excitation light EL) outputted from the light source 110 into light (fluorescent light FL) in a different wavelength range and outputs the fluorescent light FL. The wavelength converter 120 is a so-called transmissive wavelength conversion element provided, for example, with a phosphor layer on the front surface of a support substrate having light transmissivity. The wavelength converter 120 is configured to output the fluorescent light FL to the back surface of the support substrate. The fluorescent light FL is generated by the coming excitation light EL.

The condensing lenses 130A and 130B condense, at a predetermined position on the wavelength converter 120, light that is outputted, for example, from the light source 110 and enters the condensing lenses 130A and 130B through the condensing mirrors 111A, 111B, and 112.

Light (e.g., blue light) outputted from the light source 110 is reflected by the condensing mirrors 111A, 111B, and 112 to enter the condensing lenses 130A and 130B. The predetermined position on the wavelength converter 120 is irradiated with the light. The wavelength of the light entering the wavelength converter 120 is converted (e.g., yellow light) in the phosphor layer. The yellow light is outputted toward the image formation optical system 200. This yellow light is multiplexed with blue light outputted, for example, from a blue light source (not illustrated) separately provided in the light source unit 100 and enters the image formation optical system 200 as the white illumination light L.

The image formation optical system 200 includes, for example, an illumination optical system 210 and an image formation section 220.

The illumination optical system 210 includes fly eye lenses 211 (211A and 211B), a polarization conversion element 212, a lens 213, dichroic mirrors 214A and 214B, reflecting mirrors 215A and 215B, relay lenses 216A and 216B, a dichroic mirror 217, and polarizing plates 218R, 218G, and 218B from positions closer to the light source unit 100.

The fly eye lenses 211 (211A and 211B) make uniform the illuminance distribution of the illumination light L from the light source unit 100. The illumination light L is divided into a plurality of light fluxes by the plurality of microlenses of the fly eye lens 211A. Images of the plurality of light fluxes are formed on the respective corresponding microlenses of the fly eye lens 211B. The plurality of microlenses of the fly eye lens 211B each functions as a secondary light source and outputs a plurality of pieces of parallel light having uniform luminance to the polarization conversion element 212.

The polarization conversion element 212 aligns the polarization axes of the pieces of illumination light L to offer a predetermined polarization state. The pieces of illumination light L enter the polarization conversion element 212 through the fly eye lenses 211 (211A and 211B) or the like. For example, the polarization conversion element 212 converts randomly polarized light into P-polarized light. The polarization conversion element 212 outputs the illumination light L, for example, through a lens or the like disposed on the output side of the light source unit 100. The illumination light L includes red light Lr, green light Lg, and blue light Lb.

The lens 213 condenses light from the polarization conversion element 212 toward the dichroic mirrors 214A and 214B.

Each of the dichroic mirrors 214A and 214B selectively reflects light in a predetermined wavelength range and selectively transmits pieces of light in the other wavelength ranges. For example, the dichroic mirror 214A chiefly reflects the red light Lr and the green light Lg in the direction of the reflecting mirror 215A. In addition, the dichroic mirror 214B chiefly reflects the blue light Lb in the direction of the reflecting mirror 215B. This separates the illumination light L outputted from the light source unit 100 into a plurality of pieces of color light (e.g., the red light Lr, the green light Lg, and the blue light Lb) different in color.

The reflecting mirror 215A reflects light (chiefly the red light Lr and the green light Lg) from the dichroic mirror 214A toward the relay lens 216A and the reflecting mirror 215B reflects light (chiefly the blue light Lb) from the dichroic mirror 214B toward the relay lens 216B.

The relay lens 216A transmits light (chiefly the red light Lr and the green light Lg) from the reflecting mirror 215A and condenses the light on the dichroic mirror 217. The relay lens 216B transmits light (chiefly the blue light Lb) from the reflecting mirror 215B and condenses the light on the polarizing plate 218B.

The dichroic mirror 217 selectively reflects the green light Lg toward the polarizing plate 218G and selectively transmits pieces of light in the other wavelength ranges.

Each of the polarizing plates 218R, 218G, and 218B includes a polarizer having a polarization axis in a predetermined direction. For example, in a case where light is converted into P-polarized light by the polarization conversion element 212, each of the polarizing plates 218R, 218G, and 218B transmits the P-polarized light and reflects S-polarized light.

The image formation section 220 includes reflective polarizing plates 221R, 221G, and 221B, liquid crystal panels 222R, 222G, and 222B for respectively modulating the red light Lr, the green light Lg, and the blue light Lb, and a dichroic prism 223.

The reflective polarizing plates 221R, 221G, and 221B respectively transmit pieces of light (e.g., pieces of P-polarized light) having the same polarization axes as the polarization axes of pieces of polarized light from the polarizing plates 218R, 218G, and 218B and reflect pieces of light (pieces of S-polarized light) having the other polarization axes. Specifically, the reflective polarizing plate 221R transmits the P-polarized red light Lr from the polarizing plate 218R in the direction of the liquid crystal panel 222R. The reflective polarizing plate 221G transmits the P-polarized blue light Lb from the polarizing plate 218G in the direction of the liquid crystal panel 222G. The reflective polarizing plate 221B transmits the P-polarized green light Lg from the polarizing plate 218B in the direction of the liquid crystal panel 222B. In addition, the reflective polarizing plate 221R reflects the S-polarized red light Lr from the liquid crystal panel 222R to cause the S-polarized red light Lr to enter the dichroic prism 223. The reflective polarizing plate 221G reflects the S-polarized blue light Lb from the liquid crystal panel 222G to cause the S-polarized blue light Lb to enter the dichroic prism 223. The reflective polarizing plate 221B reflects the S-polarized green light Lg from the liquid crystal panel 222B to cause the S-polarized green light Lg to enter the dichroic prism 222.

The liquid crystal panels 222R, 222G, and 222B are electrically coupled to an unillustrated signal source (e.g., PC or the like) that supplies image signals including image information. The liquid crystal panels 222R, 222G, and 222B spatially modulate the red light Lr, the green light Lg, and the blue light Lb for the respective pixels on the basis of supplied image signals of the respective colors to respectively generate a red color image, a green color image, and a blue color image.

The dichroic prism 223 combines the red light Lr, the blue light Lb, and the green light Lg modulated by the liquid crystal panels 222R, 222G, and 222B and emits the combined light toward the projection optical system 300.

The projection optical system 300 includes, for example, a plurality of lenses and the like. The projection optical system 300 enlarges image light from the image formation section 220 and projects the enlarged image light on the screen 1000 or the like.

The cooling unit 400 is for cooling the image formation optical system 200. Although described in detail below, the cooling unit 400 includes, for example, one or more fans (e.g., the fans 410, 420, and 440).

The heat exchanger 500 is for transferring heat generated in the image formation optical system 200 to the heat dissipation unit 800. For example, as illustrated in FIG. 3, the heat exchanger 500 has a structure in which a plurality of fins 511 each including, for example, a metal plate is provided to stand, for example, on the lower surface of the case 900 at predetermined intervals. The heat exchanger 500 is provided, for example, over the image formation optical system 200 and the cooling unit 400.

The power supply unit 600 includes power supply circuits or the like for a variety of optical systems (e.g., the light source unit 100 and the like) and the cooling unit 400 housed in the case 900. The power supply unit 600 includes a plurality of elements.

Although not illustrated, the signal processing unit 700 includes, for example, a light source driver, an image processor, a projection optical system driver, a controller, and the like.

The image processor acquires an image signal inputted from the outside. For example, the image processor determines the size and resolution of an image and determines whether the image is a still image or a moving image. In a case of a moving image, the image processor also determines the attributes or the like of the data of the image such as a frame rate.

The projection optical system driver includes a motor that drives a lens disposed in the projection optical system 300. This projection optical system driver drives, for example, the projection optical system 300 and makes, for example, a zoom adjustment, a focus adjustment, an aperture adjustment, and the like under the control of the controller.

The controller controls, for example, the light source driver, the image processor, and the projection optical system driver.

The heat dissipation unit 800 is for dissipating heat generated in the case 900. The heat dissipation unit 800 has a structure in which a plurality of fins each including, for example, a metal plate is stacked at predetermined intervals as with the heat exchanger 500 and coupled to each other, for example, by a heat pipe. The heat pipe is also coupled, for example, to the plurality of fins 511 included in the heat exchanger 500. This transfers heat generated in the image formation optical system 200 to the heat dissipation unit 800 through the heat exchanger 500.

1-2. Configuration of Cooling Unit

FIG. 3 illustrates examples of configurations of the plurality of fans (fans 410, 420, and 430) included in the cooling unit 400 illustrated in FIG. 1 and the heat exchanger 500. FIG. 4 illustrates cross-sectional configurations of the cooling unit 400 and the heat exchanger 500 taken along the I-I line illustrated in FIG. 3. FIG. 5 illustrates cross-sectional configurations of the cooling unit 400 and the heat exchanger 500 taken along the II-II line illustrated in FIG. 3.

As described above, the cooling unit 400 is for cooling the image formation optical system 200. The cooling unit 400 cools, for example, the reflective polarizing plates 221R, 221G, and 221B. As illustrated in FIG. 3, the cooling unit 400 includes, for example, the three fans 410, 420, and 430.

The following describes the structures of the fans 410, 420, and 430 by using the fan 410 as an example. Although not illustrated, the fan 410 includes, for example, a main body section 411 and a case 412. The main body section 411 includes a motor and a rotating blade that rotates integrally with the rotor of the motor. The case 412 houses the main body section 411. The case 412 has an intake port 413 on one of the pair of planar sections opposed to each other and a blower port 414 on a side surface section. This blower port 414 is spatially coupled, for example, to the reflective polarizing plate 221B. Air taken in from the intake port 413 is sent from the blower port 414 toward the reflective polarizing plate 221B as cooling wind. It is possible to use, for example, sirocco fans or centrifugal fans as the fans 410, 420, and 430 like these.

In the present embodiment, the respective intake ports 413, 423, and 433 of the three fans 410, 420, and 430 are disposed to be directly or indirectly opposed to the heat exchanger 500. Specifically, for example, as illustrated in FIG. 3 or the like, the fan 410 is disposed to cause the intake port 413 to be right opposed to a surface 511S on which the plurality of fins 511 included in the heat exchanger 500 is provided to stand. This causes the heat exchanger 500 to eliminate noise generated in a case where air is taken in from the intake port 413.

For example, as illustrated in FIG. 3 or the like, the fan 420 is disposed to be stacked above the opposite surface to the surface on which the intake port 413 of the fan 410 is provided to cause the intake port 423 to be right opposed to the surface 511S as with the fan 410. In other words, the intake port 423 of the fan 420 is disposed to be right opposed to the surface 511S with the fan 410 interposed in between. The plurality of fins 511 is provided to stand on the surface 511S. A blower port 424 of the fan 420 is spatially coupled, for example, to the reflective polarizing plate 221G. Air taken in from the intake port 423 is sent from the blower port 424 toward the reflective polarizing plate 221G as cooling wind.

For example, as illustrated in FIG. 3 or the like, for example, the pair of planar sections of the fan 430 opposed to each other is disposed along the stack direction (e.g., Z axis direction) of the fan 410 and the fan 420. The intake port 433 of the fan 430 is disposed on the opposite side, for example, to the fans 410 and 420. The intake port 433 is disposed to right opposed to the surface 511S indirectly through a duct. The plurality of fins 511 is provided to stand on the surface 511S. A blower port 434 of the fan 430 is spatially coupled, for example, to the reflective polarizing plate 221R, for example, through a duct. Air taken in from the intake port 433 is sent from the blower port 434 toward the reflective polarizing plate 221R as cooling wind.

Further, in the present embodiment, the three fans 410, 420, and 430 are covered with two cases 910 and 920 in the case 900, for example, as illustrated in FIG. 6.

The case 910 covers the three fans 410, 420, and 430 and the heat exchanger 500. The case 910 further functions as a member that supports the three fans 410, 420, and 430. The respective positions of the three fans 410, 420, and 430 are fixed, for example, by the case 910. In particular, the fan 420 is attached to be adapted to an opening 910H. A case 422 of the fan 420 is included in a portion of a portion of the case 910. The opening 910H is provided on the upper surface of the case 910 that covers the area above the fan 410. The opening 910H has substantially the same shape as the shape of the intake port 423. The three fans 410, 420, and 430 and the heat exchanger 500 are housed in a substantially sealed space defined by the case 910. This substantially sealed space is used as a duct that spatially couples each of the three fans 410, 420, and 430 and the heat exchanger 500.

The case 920 covers the three fans 410, 420, and 430, the heat exchanger 500, and the image formation optical system 200. The case 920 is disposed outside the case 910. This causes the intake port 433 of the fan 430 to be covered with the double case (cases 910 and 920). The fan 430 is disposed along the of the stack direction of the fan 410 and the fan 420.

The case 910 further has an opening at the position corresponding, for example, to the image formation section 220. This couples the spaces inside the case 910 and the case 920 and circulates air. Specifically, air warmed by being taken in from the respective intake ports 413, 423, and 433 of the fans 410, 420, and 430 and sent from the respective blower ports 414, 424, and 434 toward the reflective polarizing plates 221R, 221G, and 221B is transferred to the heat exchanger 500 through the opening of the case 910. The transferred air is cooled by the plurality of fins 511 included in the heat exchanger 500. The cooled air is taken in again from the respective intake ports 413, 423, and 433 of the fans 410, 420, and 430.

1-3. Workings and Effects

The projection display apparatus 1 according to the present embodiment has the fans (fans 410, 420, and 430) and the heat exchanger 500 disposed to be right opposed to each other. This causes the heat exchanger 500 to eliminate noise generated from the fans 410, 420, and 430. The fans (fans 410, 420, and 430) sent cooling wind, for example, to the reflective polarizing plates 221R, 221G, and 221B of the image formation optical system 200. The following describes this.

In recent years, projection display apparatuses have been higher in luminance. Higher heat has been accordingly generated in optical systems. As a method of cooling the optical systems, a projection display apparatus has been developed that houses and cools a cooling target in a sealed space as described above. The circulation temperature of a sealed portion of a typical projection display apparatus is, however, increased easily, for example, because of heat from a peripheral component such as the light source unit 100. Increasing the rotation speed of a cooling fan to obtain sufficient cooling efficiency raises an issue about increasing noise.

To address this, the fans 410, 420, and 430 and the heat exchanger 500 are disposed to be right opposed to each other in the present embodiment. The fans 410, 420, and 430 send cooling wind, for example, to the reflective polarizing plates 221R, 221G, and 221B. Specifically, the respective intake ports 413 and 423 of the fan 410 and the fan 420 are disposed to be right opposed to the surface 511S on which the plurality of fins 511 included in the heat exchanger 500 is provided to stand. Further, the intake port 433 of the fan 430 is right opposed to the surface 511S spatially through a duct. This causes the heat exchanger 500 to eliminate noise generated from the fans 410, 420, and 430.

The heat exchanger 500 thus eliminates noise generated from the fans 410, 420, and 430 because the projection display apparatus 1 according to the present embodiment has the intake ports 413, 423, and 433 of the fans 410, 420, and 430 disposed to be right opposed to the surface 511S on which the plurality of fins 511 is provided to stand. The fans 410, 420, and 430 are a cause of noise. This makes it possible to increase the quietness while achieving higher luminance.

In addition, the projection display apparatus 1 according to the present embodiment has the fans 410, 420, and 430 covered with the two cases of the case 910 and the case 920. The case 910 houses the cooling unit 400 and the heat exchanger 500. The case 920 houses the image formation optical system 200 in addition to the cooling unit 400 and the heat exchanger 500. In other words, the fans 410, 420, and 430 are covered with the case having a substantially sealed double structure. This makes it possible to further increase the cooling efficiency and the quietness. In addition, it is possible to increase the dust-proofing performance.

2. Modification Examples

Although the present technology has been described above with reference to the embodiment, the present technology is not limited to the embodiment described above. A variety of modifications are possible. For example, the example in which intake ports (e.g., intake ports 413, 423, and 433) are disposed to be right opposed directly to the heat exchanger 500 or right opposed to the heat exchanger 500 with another fan (e.g., fan 410) interposed in between or the example in which intake ports are spatially coupled to the heat exchanger 500 through a duct has been described in the embodiment described above, but this is not limitative. For example, as illustrated in FIG. 7, the fan 440 may be disposed, for example, above the heat exchanger 500, for example, along the Z axis direction. There may be provided a duct 911 that spatially couples an intake port 443 thereof and the case 910. An opening 911H of this duct 911 may be disposed to be right opposed to the heat exchanger 500. Alternatively, for example, as illustrated in FIG. 8, a fan 540 may be disposed to cause the opposite surface to the surface having, for example, an intake port 453 to be right opposed to the heat exchanger 500. An opening 912H defined by a side surface section of a case 452 and the case 910 may be disposed to be right opposed to the heat exchanger 500. In other words, it is sufficient if the intake ports of the respective fans are right opposed to the heat exchanger 500 spatially. To obtain an effect similar to that of the embodiment described above, it is not always necessary that the intake ports of the respective fans be disposed to be right opposed to the heat exchanger 500. These openings 911H and 912H each correspond to a specific example of a "second intake port" according to the present disclosure.

In addition, the disposition of the components of the optical systems exemplified in the embodiment described above, the number of components, and the like are merely examples. Each of the optical system does not have to include all of the components. Alternatively, the optical system may further include other components.

Further, as the projection display apparatus according to the present disclosure, an apparatus other than the projection display apparatus 1 described above may be configured. For example, the example in which a reflective liquid crystal panel is used as a spatial modulation element has been described in the embodiment described above. The present technology is, however, applicable, for example, to a transmissive 3LCD projection display apparatus that performs optical modulation by using, for example, transmissive liquid crystal panels. Still further, a liquid crystal panel is a non-limiting example of a spatial modulation element. It is also possible to use, for example, DMD (Digital Micromirror Device) or the like.

It is to be noted that the effects described in this specification are merely examples, but not limited to the description. There may be other effects.

The present technology may also have the following configurations. According to the present technology having the following configurations, the fan provided in the cooling unit and the heat exchanger are disposed to be right opposed to each other. This causes the heat exchanger to eliminate noise generated from the fan. The fan sends the cooling wind to the image formation optical system including the spatial modulation element. In addition, it is possible to increase the quietness.

(1)
A projection display apparatus including:
a light source unit;
an image formation optical system including a spatial modulation element that modulates light emitted from the light source unit;
a projection optical system that projects the light from the spatial modulation element;
a cooling unit including a fan that sends cooling wind to the image formation optical system; and
a heat exchanger that is disposed to be right opposed to the fan.

(2)
The projection display apparatus according to (1), in which the fan has a pair of planar sections one of which has an intake port and a side surface section having a blower port and the planar section having the intake port is disposed to be right opposed to the heat exchanger.

(3)
The projection display apparatus according to (2), in which
the heat exchanger has a structure in which a plurality of fins is provided to stand at a predetermined interval, and
the planar section of the fan having the intake port is disposed to be right opposed to a surface on which the plurality of fins is provided to stand.

(4)
The projection display apparatus according to (1), in which
the fan has a pair of planar sections one of which has a first intake port, a side surface section having a blower port, and a duct that forms a second intake port spatially coupled to the first intake port, and
the second intake port is disposed to be right opposed to the heat exchanger.

(5)
The projection display apparatus according to (1), further including a case that surrounds the cooling unit, in which
the fan has a pair of planar sections one of which has a first intake port, a side surface section having a blower port, a second intake port defined by the side surface section and the case, and
the second intake port is disposed to be right opposed to the heat exchanger.

(6)
The projection display apparatus according to (4) or (5), in which
the heat exchanger has a structure in which a plurality of fins is provided to stand at a predetermined interval, and
the second intake port of the fan is disposed to be right opposed to a surface on which the plurality of fins is provided to stand.

(7)
The projection display apparatus according to any one of (1) to (6), further including a case having a double structure, the case surrounding the cooling unit.

(8)
The projection display apparatus according to any one of (1) to (6), in which
the cooling unit includes a first fan and a second fan, and
the first fan and the second fan are stacked above the heat exchanger.

(9)
The projection display apparatus according to (8), in which
an intake port of the first fan is right opposed to the heat exchanger, and
an intake port of the second fan is right opposed to the heat exchanger with the first fan interposed in between.

(10)
The projection display apparatus according to (8) or (9), in which
the cooling unit further includes a third fan, and
the third fan is disposed along a stack direction of the first fan and the second fan.

(11)

The projection display apparatus according to (10), in which an intake port of the third fan is disposed on an opposite side to the first fan and the second fan that are stacked.

(12)

The projection display apparatus according to (10) or (11), in which an intake port of the third fan is spatially coupled to the heat exchanger through a duct.

(13)

The projection display apparatus according to any one of (10) to (12), further including a case having a double structure, the case surrounding the cooling unit, in which the case includes a first case that surrounds the first fan, the second fan, and the third fan, and a second case that surrounds the image formation optical system along with the first fan, the second fan, and the third fan.

(14)

The projection display apparatus according to any one of (1) to (13), in which the image formation optical system includes a polarizing plate, and the cooling wind is sent toward the polarizing plate.

(15)

The projection display apparatus according to any one of (1) to (14), in which the fan includes a sirocco fan or a centrifugal fan.

This application claims the priority on the basis of Japanese Patent Application No. 2020-088344 filed with Japan Patent Office on May 20, 2020, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A projection display apparatus comprising:

a light source unit;

an image formation optical system including a spatial modulation element that modulates light emitted from the light source unit;

a projection optical system that projects the light from the spatial modulation element;

a cooling unit including a fan that sends cooling wind to the image formation optical system; and a heat exchanger that is disposed to be right opposed to the fan, wherein the fan has a pair of planar sections one of which has a first intake port, a side surface section having a blower port, and a duct that forms a second intake port spatially coupled to the first intake port, and the second intake port is disposed to be right opposed to the heat exchanger.

2. The projection display apparatus according to claim 1, wherein the fan has a pair of planar sections one of which has an intake port and a side surface section having a blower port and the planar section having the intake port is disposed to be right opposed to the heat exchanger.

3. The projection display apparatus according to claim 2, wherein the heat exchanger has a structure in which a plurality of fins is provided to stand at a predetermined interval, and the planar section of the fan having the intake port is disposed to be right opposed to a surface on which the plurality of fins is provided to stand.

4. The projection display apparatus according to claim 1, wherein the heat exchanger has a structure in which a plurality of fins is provided to stand at a predetermined interval, and the second intake port of the fan is disposed to be right opposed to a surface on which the plurality of fins is provided to stand.

5. The projection display apparatus according to claim 1, further comprising a case having a double structure, the case surrounding the cooling unit.

6. The projection display apparatus according to claim 1, wherein the cooling unit includes a first fan and a second fan, and the first fan and the second fan are stacked above the heat exchanger.

7. The projection display apparatus according to claim 1, wherein the image formation optical system includes a polarizing plate, and the cooling wind is sent toward the polarizing plate.

8. The projection display apparatus according to claim 1, wherein the fan includes a sirocco fan or a centrifugal fan.

9. A projection display apparatus comprising:

a light source unit;

an image formation optical system including a spatial modulation element that modulates light emitted from the light source unit;

a projection optical system that projects the light from the spatial modulation element;

a cooling unit including a fan that sends cooling wind to the image formation optical system;

a heat exchanger that is disposed to be right opposed to the fan; and a case that surrounds the cooling unit, wherein the fan has a pair of planar sections one of which has a first intake port, a side surface section having a blower port, a second intake port defined by the side surface section and the case, and the second intake port is disposed to be right opposed to the heat exchanger.

10. A projection display apparatus comprising:

a light source unit;

an image formation optical system including a spatial modulation element that modulates light emitted from the light source unit;

a projection optical system that projects the light from the spatial modulation element;

a cooling unit including a fan that sends cooling wind to the image formation optical system; and a heat exchanger that is disposed to be right opposed to the fan, wherein the cooling unit includes a first fan and a second fan, the first fan and the second fan are stacked above the heat exchanger, an intake port of the first fan is right opposed to the heat exchanger, and an intake port of the second fan is right opposed to the heat exchanger with the first fan interposed in between.

11. A projection display apparatus comprising:

a light source unit;

an image formation optical system including a spatial modulation element that modulates light emitted from the light source unit;

a projection optical system that projects the light from the spatial modulation element;

a cooling unit including a fan that sends cooling wind to the image formation optical system; and a heat exchanger that is disposed to be right opposed to the fan, wherein the cooling unit includes a first fan and a second fan, the first fan and the second fan are stacked above the heat exchanger, the cooling unit further includes a third fan, and the third fan is disposed along a stack direction of the first fan and the second fan.

12. The projection display apparatus according to claim 11, wherein an intake port of the third fan is disposed on an opposite side to the first fan and the second fan that are stacked.

13. The projection display apparatus according to claim 11, wherein an intake port of the third fan is spatially coupled to the heat exchanger through a duct.

14. The projection display apparatus according to claim 11, further comprising a case having a double structure, the case surrounding the cooling unit, wherein the case includes a first case that surrounds the first fan, the second fan, and the third fan, and a second case that surrounds the image formation optical system along with the first fan, the second fan, and the third fan.

\* \* \* \* \*